(12) United States Patent
Ramirez et al.

(10) Patent No.: US 11,936,947 B2
(45) Date of Patent: Mar. 19, 2024

(54) SYSTEMS AND METHODS FOR AUTOMATICALLY IDENTIFYING A USER PREFERENCE FOR A PARTICIPANT FROM A COMPETITION EVENT

(71) Applicant: Rovi Guides, Inc., San Jose, CA (US)

(72) Inventors: Maria Rocio Ramirez, Belmont Hills, PA (US); Denisse Breaux, Lansdale, PA (US); Angel Merced, Wilmington, DE (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 18/139,619

(22) Filed: Apr. 26, 2023

(65) Prior Publication Data
US 2023/0269425 A1    Aug. 24, 2023

Related U.S. Application Data

(63) Continuation of application No. 17/568,130, filed on Jan. 4, 2022, now Pat. No. 11,671,658, which is a continuation of application No. 17/041,646, filed as application No. PCT/US2018/024749 on Mar. 28, 2018, now Pat. No. 11,245,962.

(51) Int. Cl.
| | |
|---|---|
| *H04N 21/442* | (2011.01) |
| *G06V 20/40* | (2022.01) |
| *G06V 40/16* | (2022.01) |
| *G10L 15/26* | (2006.01) |
| *H04N 21/25* | (2011.01) |
| *H04N 21/466* | (2011.01) |

(52) U.S. Cl.
CPC ....... *H04N 21/44218* (2013.01); *G06V 20/42* (2022.01); *G06V 40/174* (2022.01); *G10L 15/26* (2013.01); *H04N 21/251* (2013.01); *H04N 21/4668* (2013.01)

(58) Field of Classification Search
CPC .......... H04N 21/44218; H04N 21/251; H04N 21/4668; G06V 40/174; G06V 20/42; G10L 15/26

See application file for complete search history.

(56) References Cited

U.S. PATENT DOCUMENTS

| | | |
|---|---|---|
| 6,239,794 B1 | 5/2001 | Yuen et al. |
| 6,564,378 B1 | 5/2003 | Satterfield et al. |
| 7,165,098 B1 | 1/2007 | Boyer et al. |

(Continued)

FOREIGN PATENT DOCUMENTS

WO    2013088307 A1    6/2013

*Primary Examiner* — Nnenna N Ekpo
(74) *Attorney, Agent, or Firm* — HALEY GUILIANO LLP

(57) ABSTRACT

Systems and methods are disclosed herein for determining a preference of a user for or against a participant of an event when a media asset relating to the event is being played based on monitoring user reactions to the event. Specifically, the media guidance application may detect a change of at least one of the biometric state (e.g., pulse rate, blood pressure, etc.) and physiological state (e.g., facial expression, gesture, body movement, etc.) with a user. The media guidance application may determine that an event has occurred within the sporting event that triggered the change. The media guidance application may determine that the user favors the first participant over the second participant, if the user reacts positively towards a score for the first participant in the event.

20 Claims, 10 Drawing Sheets

(56) References Cited

U.S. PATENT DOCUMENTS

| | | | |
|---|---|---|---|
| 7,761,892 | B2 | 7/2010 | Ellis et al. |
| 8,046,801 | B2 | 10/2011 | Ellis et al. |
| 10,187,690 | B1 * | 1/2019 | Garcia ............. H04N 21/44226 |
| 11,012,719 | B2 * | 5/2021 | Mickelsen ............. G06V 20/52 |
| 2002/0174430 | A1 | 11/2002 | Ellis et al. |
| 2005/0251827 | A1 | 11/2005 | Ellis et al. |
| 2009/0150919 | A1 | 6/2009 | Lee et al. |
| 2010/0131443 | A1 | 5/2010 | Agarwal et al. |
| 2010/0153885 | A1 | 6/2010 | Yates |
| 2013/0268955 | A1 | 10/2013 | Conrad et al. |
| 2014/0366049 | A1 | 12/2014 | Lehtiniemi et al. |
| 2016/0212466 | A1 | 7/2016 | Nauseef et al. |
| 2018/0376187 | A1 | 12/2018 | Everett et al. |
| 2021/0136448 | A1 | 5/2021 | Ramirez et al. |

\* cited by examiner

SYSTEMS AND METHODS FOR AUTOMATICALLY IDENTIFYING A USER PREFERENCE FOR A PARTICIPANT FROM A COMPETITION EVENT

CROSS-REFERENCE TO RELATED APPLICATIONS

This application is a continuation of U.S. patent application Ser. No. 17/568,130, filed Jan. 4, 2022, which is a continuation of U.S. patent application Ser. No. 17/041,646, filed Sep. 25, 2020, now U.S. Pat. No. 11,245,962, which is a national stage application under 35 U.S.C. § 371 of International Application PCT/US2018/024749, filed Mar. 28, 2018, which are hereby incorporated by reference herein in their entireties.

BACKGROUND

Some existing media systems may keep a user interest profile for targeted advertising. For example, the existing media system may store information that a user is interested in "automobiles," "Lakers," "basketball." The media system sometimes provides advertisements relating to automobiles, products endorsed by "Lakers" players, and/or the like to the user. The user interest profile is usually built upon user activity history, such as user browsing history, user selection of television programs, user subscription of channels, user comments relating to a particular program (e.g., a Lakers game), and/or the like. However, as the existing media system may update the user interest profile based on the user's latest Internet or viewing activities, the stored user interest is not updated in real time when the user is watching a media asset. Specifically, a sports fan who is generally interested in a sports event (e.g., the World Cup) can often develop an interest or preference towards a particular participant when watching a live game, even if the person has not previously exhibited such preference. Current systems are unable to capture the changing user sentiment towards a participant in a live event. Thus, current media systems may fail to recommend content that the user may otherwise be interested in, the user may miss out content and the viewing experience is thus compromised. In addition, by failing to providing content recommendation, e.g., targeted advertisements, the current media systems may lose advertisement and business opportunities with potential customers.

SUMMARY

The advancement of digital transmission of media content has increased the amount of data that can be transmitted. In particular, media systems may transmit metadata that includes detailed information about media content. This metadata may include descriptions and tags to important events within the media asset. While this information, by itself, is not useable for displaying to a human user, computer processors can read and interpret this information. However, while computer processors may read and interpret this information, and generate media content for display that may be useable by a human user (e.g., output media content on a display screen in a human recognizable format), these systems still fail to solve the aforementioned problem when implemented in computer systems because: (i) different users may be using different devices (and may not see the metadata, if displayed on a particular device, to interpret information from the metadata); and (ii) even if a user can manually interpret information from the metadata associated with a media asset, the user still needs to take time to manually input the interpretation into a media system, which cannot capture changing user sentiments towards a participant in a live event as the live event progresses.

Accordingly, to overcome the problems created when recommending content to a user who is watching a live event based on a user preference towards to one of the participants in the live event, systems and methods are disclosed herein for determining a preference of a user for or against a participant of an event when a media asset relating to the event is being viewed based on monitoring user reactions to the event.

Specifically, the media guidance application may monitor a biometric state of a user and a physiological state of the user. The media guidance application may detect a change of at least one of the biometric state (e.g., pulse rate, blood pressure, etc.) and physiological state (e.g., facial expression, gesture, body movement, etc.). The change comprises a change from at least one of a base biometric state (e.g., accelerated pulse rate, etc.) and a base physiological state, respectively. In response to the detecting, the media guidance application may determine that an event has occurred within the sporting event media asset that has increased a score associated with a first participant or a second participant. In response to determining that the event has increased the score associated with the first participant, the media guidance application may determine that the user favors the first participant over the second participant, and generate a media asset recommendation to the user based on the first participant. In this way, the media guidance application is able to identify a user preference for a participant during a live game in real time, and then provide customized and targeted content to the user based on the most up-to-date user preferences.

In some embodiments, the media guidance application may receive, via visual content capturing circuitry (e.g., a camera), a video segment recording the user activities. The media guidance application may then determine, via image analysis on video frames of the video segment, whether a user movement occurs during the video segment. In response to an occurrence of the user movement, the media guidance application may capture imagery of the movement of the user, and generate, from the imagery, movement data representing a movement pattern of the user.

In some embodiments, the media guidance application may then transmit a query based on the movement data to a movement pattern database, to obtain a movement descriptor corresponding to the movement data. For example, the user movement may correspond to "high five," "arm lifting," "laughing," and/or the like.

In some embodiments, in response to an occurrence of a user vocal reaction, the media guidance application may obtain audio characteristics of the user vocal reaction, and determine a sentiment descriptor based on audio characteristics of the user vocal reaction. For example, the tone of the vocal reaction may be "passionate" and "excited." The media guidance application may also perform speech recognition analysis to extract one or more keywords from the user vocal reaction, and then add the movement descriptor, the sentiment descriptor, and the extracted one or more keywords to the set of physiological parameters.

The media guidance application may then access a data table storing biometric and physiological characteristics of a plurality of mental states. For each mental state stored in the data table, the media guidance application may compare the obtained set of biometric parameters and the set of physiological parameters with the stored biometric and physiological characteristics corresponding to the respective mental state. The media guidance application may then compute a respective overlapping metric based on the comparison. The media guidance application may determine a mental state from the plurality of mental states corresponding to a highest overlapping metric.

The media guidance application may then determine whether there is a change in the mental state of the user. For example, the media guidance application may periodically update the set of biometric parameters and the set of physiological parameters, and compute an updated highest overlapping metric based on the updated set of biometric parameters and the updated set of physiological parameters. The media guidance application may determine an updated mental state based on the updated highest overlapping metric.

In some embodiments, in response to determining that the updated mental state is different from the mental state, the media guidance application may detect that the mental state of the user has changed to the updated mental state, e.g., from "calm" to "excited," and/or the like. In response to determining that the updated mental state is the same with the mental state, e.g., the mental state may remain "excited," the media guidance application may determine a difference between the updated highest overlapping metric and the original highest overlapping metric. In response to determining that the difference is greater than a difference threshold, the media guidance application may determine that there is the change in the mental state of the user. For example, the user may have changed the mental state from "excited" to "more excited."

In response to detecting the change in the mental state of the user at a first progression point, the media guidance application may retrieve a segment of the media asset between the first progression point and a second progression point before the first progression point. The media guidance application may retrieve metadata corresponding to the segment of the media asset, e.g., captioning data. The media guidance application may then determine, based on the metadata, whether an event, e.g., a goal, has occurred within the segment of the media asset. The event may be indicative of a competitive advantage for one of the first participant and the second participant.

In response to determining that the event has occurred within the segment of the media asset, the media guidance application may associate the change in the mental state of the user with the event. For example, when the media guidance application determines a goal for Team Argentina has occurred, the media guidance application may associate a mental state of "excitement" with the goal.

In some embodiments, to associate a mental state change with an event, the media guidance application may determine whether the media asset is transmitted from a linear data source, for example, a live streaming channel featuring a live sports event. In response to determining that the media asset is transmitted from the linear data source, the media guidance application may transmit, to a server a request for information relating to mental state changes of other users who are watching the media asset. For example, the media guidance application may request information relating to user reactions of other users who are watching the same soccer game. In response to the request, the media guidance application may receive information relating to a plurality of other users who have mental state changes within a time interval around the first progression point. The media guidance application may determine whether the number of the plurality of other users is greater than a social watching threshold. In response to determining that the number of the plurality of other users is greater than the social watching threshold, the media guidance application may determine that the change in the mental state of the user is related to the event.

In some embodiments, the media guidance application may determine whether any factor other than the event in the media asset leads to the change of the mental state of the user. For example, the media guidance application may monitor user activity while the media asset is being displayed, and determine whether an electronic communication was received by the user during playback of the segment of the media asset. The media guidance application may determine whether the user has accessed the electronic communication during the playback of the first segment of the media asset based on the set of physiological parameters. In response to determining that the user has accessed the electronic communication, the media guidance application may determine a first time instance when the user accessed the electronic communication, and a second time instance corresponding to the detected change of mental state of the user. For example, if the second time instance is later than the first time instance but within a pre-defined time lapse, the media guidance application may determine that the electronic communication is the factor other than the event in the media asset that leads to the change of the mental state of the user. Thus, the media guidance application may disassociate the change in the mental state of the user with the event.

The media guidance application may then determine, based on a type of the change in the mental state of the user, a user preference for or against the one of the first participant and the second participant.

In some embodiments, the media guidance application may retrieve a user profile corresponding to the user, and determine whether the user profile includes one or more user interest indicators that conflict with the determined user preference. For example, the media guidance application may then compare the one or more user interest indicators with the determined user preference for or against the one of the first participant and the second participant, and detect, based on the comparing, whether a conflict exists between the one or more user interest indicators and the determined user preference for or against the one of the first participant and the second participant.

In response to detecting the conflict, the media guidance application may retrieve, from an error log corresponding to the user profile, a logged counter indicating a number of times that the conflict relating to the one of the first participant and the second participant. In response to determining that the logged counter is greater than a threshold value, the media guidance application may overwrite the stored one or more user interest indicators with the determined user preference for or against the one of the first participant and the second participant.

When the user preference for or against a participant is determined, the media guidance application may generate for display, a content recommendation relating to the one of the first participant and the second participant when the user has a preference for the one of the first participant and the second participant. For another example, the content recommendation may be a video clip or an advertisement relating to the user preferred participant, and/or the like.

In some embodiments, in response to generating for display, a content recommendation relating to the one of the first participant and the second participant when the user has a preference for the one of the first participant and the second participant, the media guidance application may determine whether a user command (e.g., a "skip" command) indicative of an interest or disinterest in the content recommendation is received. In response to determining that the user command indicative of disinterest in the content recommendation is received, the media guidance application may generate a low confidence rating of the determined user preference for or against the one of the first participant and the second participant. In response to determining that the user command indicative of the interest in the content recommendation is not received or the user elects to watch the recommended content, the media guidance application may generate a high confidence rating of the determined user preference for or against the one of the first participant and the second participant. The media guidance application may store, with a data table storing characteristics of mental states, characteristics of the set of biometric parameters and the set of the physiological parameters as relevant to the determined mental state change with the confidence ratings.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
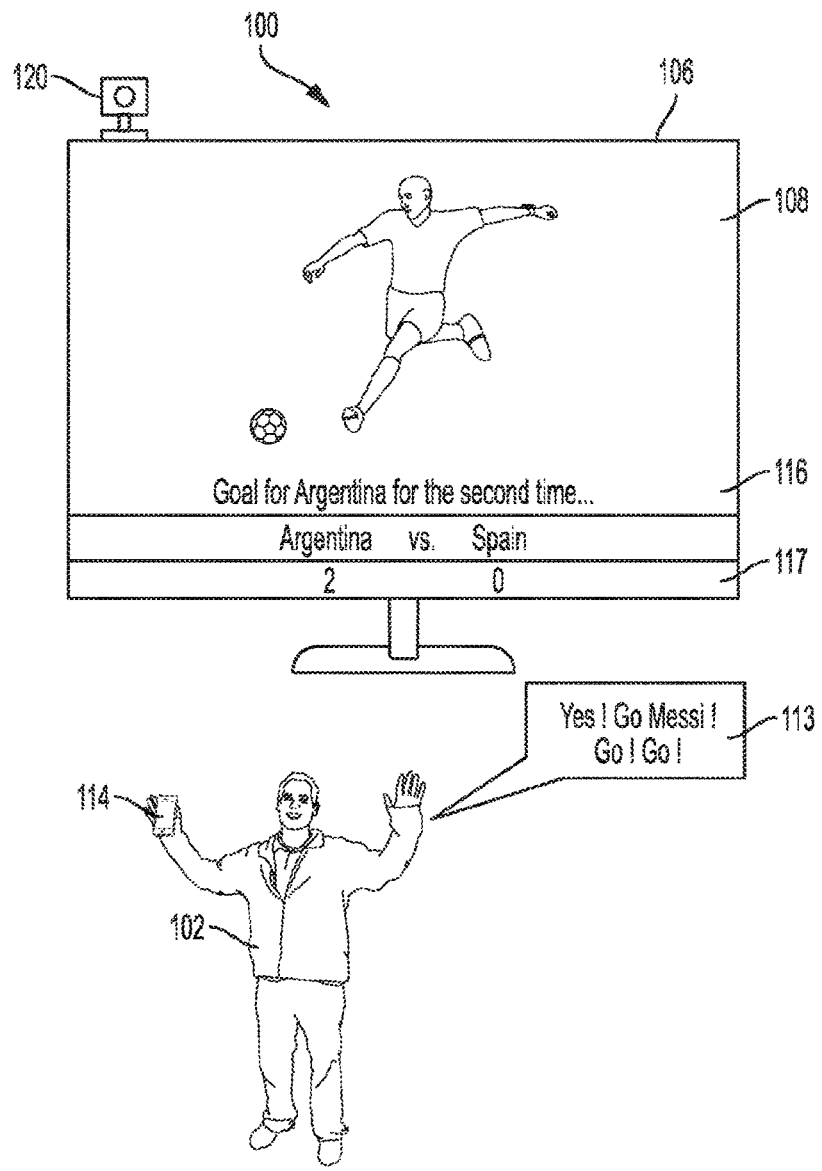
FIG. 1 depicts an illustrative example diagram 100 for determining a preference of a user for or against a participant of an event when a media asset relating to the event is being played by monitoring user reactions, in accordance with some embodiments of the disclosure.

Systems and methods are disclosed herein for determining a preference of a user for or against a participant of an event when a media asset relating to the event is being played. Specifically, a media guidance application, which is implemented at a set-top box of user equipment, may be used to engage various monitoring devices to monitor biometric parameters and physiological parameters of the user. Based on the biometric parameters and physiological parameters, the media guidance application may identify a user reaction to the event to determine a user preference for or against a participant in the event.

For example, the media guidance application may playback a media asset relating to a sports event involving two participants, e.g., a soccer game between two competing teams. The media guidance application may monitor a user's reaction to different occurrences during the sports event to determine a user preference for or against a particular participant. The media guidance application may then determine, based on metadata relating to the media asset, that the event is associated with a competition metric between the first participant and the second participant. For example, when the sports event is a soccer game, the media guidance application may monitor the score between the two competing teams. The media guidance application may detect, at a first time instance, that the competition metric changes towards a competitive advantage for the first participant. For example, when the score of the soccer game changes, one of the two teams has achieved a goal.

The media guidance application may capture, at the first time instance, via imaging capturing circuitry (e.g., a video recorder, a camera, etc.), a physical movement of the user. For example, the physical movement may include any of a body movement (e.g., jumping, crunching down, etc.), a gesture (e.g., clapping, high five, raising arms, etc.) and a facial expression (e.g., laughing, smiling, crying, etc.). The media guidance application may then determine, via pattern recognition analysis, whether the physical movement is indicative of a positive mental state of the user. For example, a jump, a laughing facial expression, a high-five gesture, and/or the like may indicate excitement of the user. For another example, crunching down and putting one's face into one's hands may indicate a depressing mood of the user. In response to determining that the physical movement is indicative of a positive mental state of the user, the media guidance application may determine that the user has a preference for the team who just scored, and stored an indicator relating to the team in a user interest profile.

As referred to herein, the term "biometric parameter" refers to a metric value measured from, or calculated based on measurements from internal to a human body. For example, the biometric parameter may include, but not limited to a pulse rate, a blood pressure, a body temperature, an electroencephalogram pattern, a pupil dilation pattern, and/or the like.

As referred to herein, the term "physiological parameter" refers to a measurement or a description of functions or activities of living organisms and their parts. For example, a physiological parameter of a user includes, but not limited to a body part movement orientation, a body part movement velocity, a pose or a gesture of a body part, a facial expression, and/or the like.

As referred to herein, the term "mental state" refers to a state of mind of an agent that connects the agent to propositional attitudes towards a matter. For example, a mental state of a user may include, but not limited to happiness, excitement, anxiety, nervousness, depression, sadness, anger, and/or the like.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in VOD systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer-readable media. Computer-readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

It is to be noted that embodiments described herein may be implemented by a media guidance application implemented on a set-top box, or any other application that receives media guidance data and that can be configured to remotely communicate with a set-top box.

With the advent of the Internet, mobile computing, and high-speed wireless networks, users are accessing media on user equipment devices on which they traditionally did not use. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters "or providers" logos, etc.), media format (e.g., standard definition, high definition, 3D, etc.), on-demand information, blogs, websites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action. As referred to herein, the term "directly in response to" refers to caused by. For example, a first action being performed directly in response to a second action may not include interstitial steps between the first action and the second action.

FIG. 1 depicts an illustrative example diagram 100 for determining a preference of a user for or against a participant of an event when a media asset relating to the event is being played by monitoring user reactions, in accordance with some embodiments of the disclosure. Diagram 100 shows user equipment 106 displaying a media asset 108, e.g., a soccer game between Argentina and Spain. The screen of user equipment 106 displaying the media asset may optionally include an area 117 showing the score between the two participants, Argentina and Spain, and a rolling captioning 116 of the media asset 108.

Diagram 100 further shows a user 102 in proximity to the user equipment 106, watching the media asset 108 being displayed at the user equipment 106. The media guidance application may capture the user's reaction to the media asset 108 to determine the user's preference for or against one of the two teams, Argentina or Spain. Specifically, the media guidance application may obtain a set of biometric parameters corresponding to a user and a set of physiological parameters corresponding to the user. For example, the media guidance application may receive, from a user device 114 in physical contact with the user, a biometric parameter. In some implementations, the user device 114 may include a wearable device (e.g., in a form of a wrist band, a headband, etc.) that measures a pulse rate, a blood pressure, a body temperature, an electroencephalogram pattern, and/or the like. In some implementations, the media guidance application may engage visual content capturing circuitry (e.g., a camera 120, etc.) to capture an image of a facial area corresponding to the user and obtain, via image analysis on the image, a biometric parameter such as a pupil dilation pattern.

In some embodiments, the media guidance application may obtain physiological parameters of the user. Specifically, the media guidance application may receive, via visual content capturing circuitry (e.g., a camera 120, etc.), a video segment recording the user activities. The media guidance application may then determine, via image analysis on video frames of the video segment, whether a user movement occurs during the video segment. For example, the media guidance application may generate a number of video frames of the video segment including the user, and identify any change of the position and the pose of the user body across the video frames. The user movement may include any of a body movement, a gesture, a facial expression, and/or the like. In response to an occurrence of the user movement, the media guidance application may capture imagery of the movement of the user, and generate, from the imagery, movement data representing a movement pattern of the user. For example, the media guidance application may identify a first set of coordinates of the position of a body part (e.g., an arm) within a first video frame, and a second set of coordinates of the position of the same body part within a second video frame consecutive to the first video frame. The transition from the first set of coordinates to the second set of coordinates is captured by a mapping relationship.

In some embodiments, the media guidance application may identify the user movement from a database. Specifically, the media guidance application may then transmit a query based on the movement data, e.g., the mapping relationship, to a movement pattern database, e.g., at storage 608 in FIG. 6 or data source 718 in FIG. 7. In response to the query, the media guidance application may obtain a movement descriptor corresponding to the movement data. For example, the user movement may correspond to "high five," "arm lifting," "laughing," and/or the like. As shown in the example in FIG. 1, the media guidance application may determine that the user 102 has a movement of "arm lifting," and facial expression of "laughing."

In some embodiments, the media guidance application may monitor whether the user has uttered a vocal reaction, e.g., by voice recognition via an audio recorder connected to user equipment 106. Specifically, in response to an occurrence of a user vocal reaction, the media guidance application may obtain audio characteristics of the user vocal reaction, and determine a sentiment descriptor based on audio characteristics of the user vocal reaction. For example, when the user 102 uttered "Yes! Go Messi! Go! Go!" 113, the media guidance application may obtain the recorded audio clip of the vocal reaction and analyze the tone of the vocal reaction as "passionate" and "excited." The media guidance application may also perform speech recognition analysis to extract one or more keywords from the user vocal reaction. For example, the keywords "Yes," "Go," "Messi," are extracted as representative of the content of the vocal reaction. The media guidance application may then add the movement descriptor (e.g., "arm lifting," "laughing"), the sentiment descriptor (e.g., "passionate," "excited"), and the extracted one or more keywords (e.g., "Yes," "Go," "Messi") to the set of physiological parameters.

The media guidance application may then determine a mental state of the user based on the set of biometric parameters and the set of physiological parameters. Specifically, the media guidance application may access, from storage 608 in FIG. 6 or data source 718 in FIG. 7, a data table storing biometric and physiological characteristics of a plurality of mental states. For example, an example data entry corresponding to a mental state of "excitement" may correspond to a range of (higher than normal) pulse rate, a range of (higher than normal) blood pressure, a radius of pupil (e.g., expanded than normal), and/or the like. The mental state of "excitement" may further correspond to a series of user movement, such as "high five," "arm lifting," and/or the like. For each mental state stored in the data table, the media guidance application may compare the obtained set of biometric parameters and the set of physiological parameters with the stored biometric and physiological characteristics corresponding to the respective mental state.

In some embodiments, the media guidance application may then compute a respective overlapping metric based on the comparison. For example, an example data entry of the mental state "excitement" may take a form similar to the following:

```
<mental_state>
    <mental_state_id> 00001 </mental_state_id>
    <mental_state_name> "excitement" </mental_state_name>
    <parameter_1>
        <parameter_name> pulse rate </parameter_name>
        <min> 65 </65>
        <max> 105 </max>
    </parameter_1>
</parameter_1>
        </parameter_name> blood pressure </parameter_name>
        <min> 120/90 </min>
        <max> . . . < /max>
    . . .
```

The media guidance application may obtain a list of the biometric and physiological parameters that fit into the range of parameters corresponding to the mental state "excitement." For example, if four matches out of six biometric or physiological parameters stored with the data entry of "excitement" are identified, the overlapping metric is considered as 4/6. For another example, each biometric or physiological parameter is associated with a pre-defined weight, e.g., a body movement "arm lifting" may be assigned to a higher weight than the pulse rate.

In some embodiments, the media guidance application may determine a mental state from the plurality of mental states corresponding to a highest overlapping metric. For example, the media guidance application may compute a first overlapping metric corresponding to the mental state "excitement" as described above, and may compute a second overlapping metric corresponding to the mental state "depression" in a similar manner, but to compare with characteristics associated with the mental state "depression." When the user 102 showing a "laughing" facial expression and a movement of "arm lifting," accompanied with biometric parameter as an elevated blood pressure and an accelerated pulse rate, the user's biometric and physiological parameters may overlap little with characteristics of the mental state "depression." In this case, the media guidance application may determine that the user 102 possesses a mental state of "excitement" instead of "depression." Specifically, the media guidance application may designate the determined mental state "excitement" as the mental state of the user.

The media guidance application may then determine whether there is a change in the mental state of the user. For example, the mental state may change from "calm" to "excited," or from "excited" to "very excited," each corresponding to different variations in the biometric and physiological parameters. Specifically, the media guidance application may periodically update the set of biometric parameters and the set of physiological parameters, and compute an updated highest overlapping metric based on the updated set of biometric parameters and the updated set of physiological parameters, e.g., in a similar manner as described above. Based on the updated set of biometric parameters and the updated set of physiological parameters, the media guidance application may determine an updated mental state based on the updated highest overlapping metric. For example, the determined updated mental state may change from "calm" to "excited," or remain as "excited."

Thus, in some embodiments, in response to determining that the updated mental state is different from the mental state, the media guidance application may detect that the mental state of the user has changed to the updated mental state, e.g., from "calm" to "excited," from "excited" to "depressed," and/or the like. In response to determining that the updated mental state is the same with the mental state, e.g., the mental state may remain "excited," the media guidance application may determine whether a level of intensity of the same mental state has changed. For example, the user 102 may exhibit an "excited" mental state while watching the sports event, and may get more "excited" in response to a goal in the sports event. Specifically, the media guidance application may determine a difference between the updated highest overlapping metric and the original highest overlapping metric. In response to determining that the difference is greater than a difference threshold, determining that there is the change in the mental state of the user. For example, when the biometric parameters of the user 102 exhibits a sudden increment in the pulse rate and blood pressure of the user, the updated overlapping metric corresponding to the mental state "excitement" may be improved with a significant increment upon the existing overlapping metric with the metal state "excitement." In this case, the media guidance application may determine that the user has changed the mental state from "excited" to "more excited."

In response to detecting the change in the mental state of the user at a first progression point, the media guidance application may identify whether an event during the playback of the media asset 108 triggered the mental state change. Specifically, the media guidance application may retrieve a segment of the media asset between the first progression point and a second progression point before the first progression point. For example, if the media guidance application determines that the user mental state changes from "calm" to "excited" at 19'30" of the media asset 108, the media guidance application may retrieve and examine the segment between 19'20" and 19'30" to identify whether any event occurs during this period of time. The media guidance application may retrieve metadata corresponding to the segment of the media asset, e.g., captioning data. The media guidance application may then determine, based on the metadata, whether an event has occurred within the segment of the media asset. The event may be indicative of a competitive advantage for one of the first participant and the second participant.

In some embodiments, the media guidance application may search through the captioning data 116 to determine whether an event has occurred. Specifically, the media guidance application may determine a type of the event featured in the media asset. For example, the media asset 108 corresponds to a soccer game, as indicated by a title of the media asset 108. The media guidance application may then retrieve, from a database (e.g., via storage 608 in FIG. 6 or data source 718 in FIG. 7) storing keywords corresponding to different types of the event, a pre-defined list of keywords corresponding to events that are likely occur during playback of the media asset based on the type of the event. For example, for the soccer game corresponding to the media asset 108, the media guidance application may retrieve a list of soccer glossaries including "goal," "penalty," "offside," "free kick," and/or the like. The media guidance application may search captioning data corresponding to the segment of the media asset for each of the pre-defined list of keywords, and obtain a subset of keywords, from the pre-defined list of keywords, that match the captioning data. For example, the media guidance application may obtain a matching keyword of "goal" from the caption line 116. The media guidance application may then determine, based on a context of the captioning data, whether the subset of keywords indicate the competitive advantage for one of the first participant and the second participant. For example, from the captioning line 116, the media guidance application may identify the term "Argentina," as the name of a participant of the soccer game, to be associated with the keyword "goal." Thus, the media guidance application may determine that Team Argentina has scored a goal in the past segment, which gains an advantage over Team Spain.

In some embodiments, the media guidance application may perform video frame analysis to identify an event, based on the type of the event and/or a media asset source. For example, the media guidance application may determine that the media asset 108 is streamed from a sports channel. Based on a media source identifier of the sports channel, the media guidance application may retrieve a video layout template used to feature soccer games in the sports channel. The media guidance application may then locate the area 117 as showing the score of the game, and thus monitor any change in the score by performing character recognition of the area 117 on the screen to detect the occurrence of a goal.

In response to determining that the event has occurred within the segment of the media asset, the media guidance application may associate the change in the mental state of the user with the event. For example, when the media guidance application determines a goal for Team Argentina has occurred, the media guidance application may associate a mental state change with the user 102, e.g., from "calm" to "excited," with the goal.

In some embodiments, the media guidance application may utilize social watching data, e.g., reactions from other users who are watching the same sports event, to determine a mental state change with the user 102. Specifically, the media guidance application may determine whether the media asset is transmitted from a linear data source, for example, a live streaming channel featuring a live sports event. In response to determining that the media asset is transmitted from the linear data source, and in response to detecting the change in the mental state of the user at a first progression point, the media guidance application may transmit, to a server (e.g., data source 718 in FIG. 7), a request for information relating to mental state changes of other users who are watching the media asset. For example, the media guidance application may request information relating to user reactions of other users who are watching the same soccer game.

In some implementations, the media guidance application may identify a group of other users in the request, e.g., users who are social connections with the user, users who are within the same geographical location (zip code) with the user, and/or the like. In response to the request, the media guidance application may receive information relating to a plurality of other users who have mental state changes within a time interval around the first progression point. For example, the media guidance application may receive a total headcount of users who have reacted (e.g., mental state change) within ten seconds after the occurrence of the goal for Team Argentina. The media guidance application may determine whether the number of the plurality of other users is greater than a social watching threshold. For example, the social watching threshold may be a threshold number of headcount of users (e.g., 500, 800, etc.). For another example, the social watching threshold may be a percentage of users (e.g., 70%, 80%, etc.) who have reacted around the progression point as compared against the total number of users who are watching the same soccer event. In response to determining that the number of the plurality of other users is greater than the social watching threshold, the media guidance application may determine that the change in the mental state of the user is related to the event. For example, the user may change to an "excited" mental state because of the goal for Argentina in the soccer game.

In some embodiments, the media guidance application may exclude other factors that may cause mood change in the user 102 when associating the mental state change with an event. Specifically, the media guidance application may determine whether any factor other than the event in the media asset leads to the change of the mental state of the user. For example, the user 102 may be affected by an electronic mail, a news feed, and/or other communication or activities. Thus, when the user 102 exhibits biometric or physiological characteristics corresponding to an "excited" mental state, the mental state change may not reflect a user reaction to an event of the media asset 108.

Figure 2:
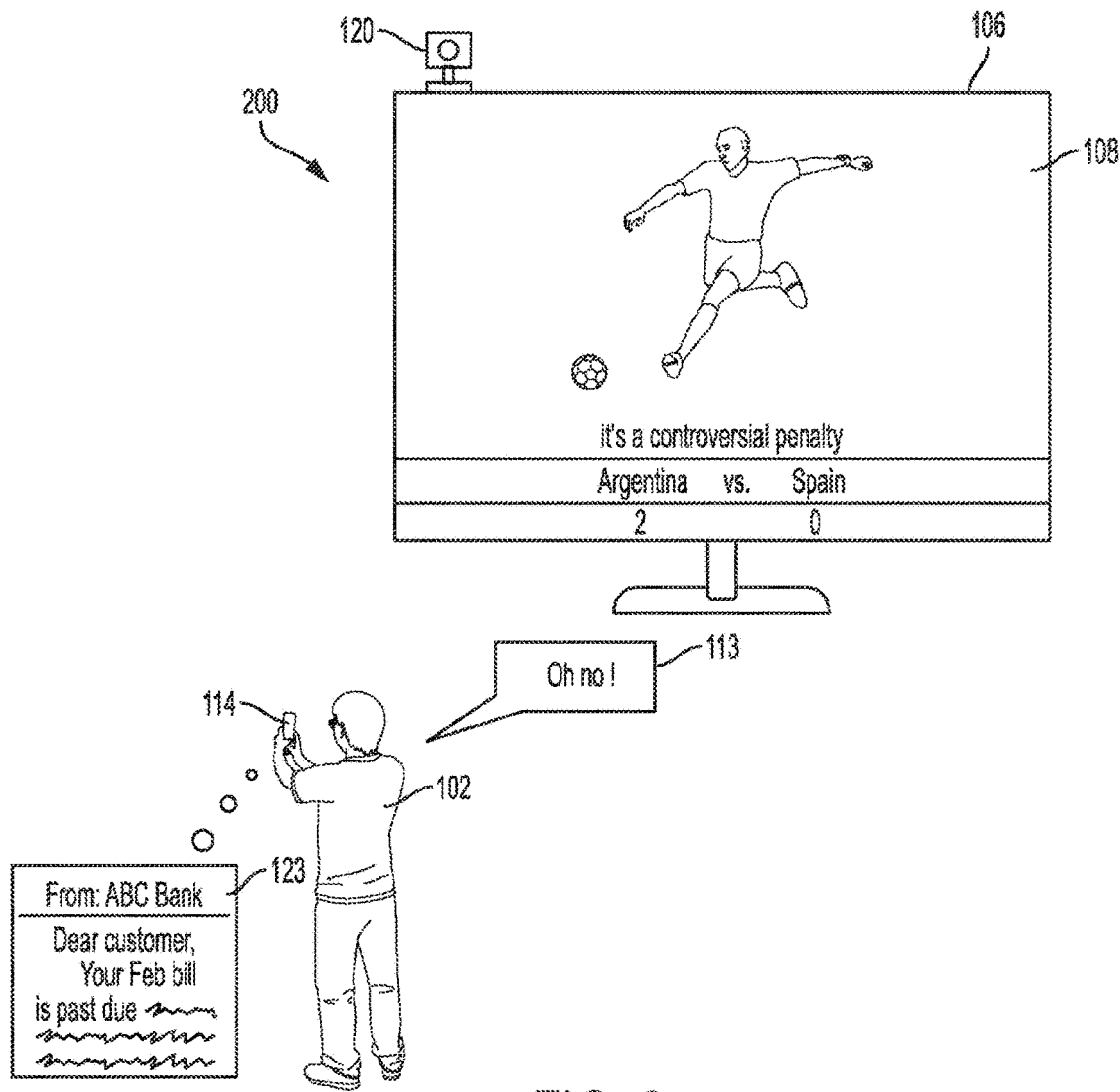
FIG. 2 provides an example diagram 200 illustrating aspects of identifying other factors that cause a mental state change with the user, according to embodiments described herein.

FIG. 2 provides an example diagram 200 illustrating aspects of identifying other factors that cause a mental state change with the user, according to embodiments described herein. As shown in FIG. 2, the user 102 may receive an electronic message 123 via a user device 114, and may then read the electronic message 123. Specifically, the media guidance application may monitor user activity while the media asset is being displayed, and determine whether an electronic communication was received by the user during playback of the segment of the media asset. For example, the electronic communication includes, but not limited to a social communication intended for the user, a news feed publication, a news ticker displayed at the user equipment 106, and/or the like.

In some implementation, to detect whether the electronic communication is received, the media guidance application may receive a notification from the user device 114, or a remote server relating to the electronic communication. In some implementation, the media guidance application may search the metadata to determine any news ticker displayed with the media asset. In some implementation, the media guidance application may engage the imaging (video) capturing device 120 to capture ambient noise in the environment, e.g., a message chime, a ring tone for phone call, and/or the like.

In some embodiments, the media guidance application may determine whether the user has accessed the electronic communication during the playback of the first segment of the media asset based on the set of physiological parameters. For example, the media guidance application may receive a "read" receipt of the electronic communication from the user device 114. For another example, the media guidance application may engage the imaging capturing device 120 to capture a pose of the user 102, to determine whether the user is paying attention to what is displayed (a news ticker) on the screen of the user equipment 106, or to identify whether the user is speaking to, or looking at the user device 114.

In some embodiments, in response to determining that the user has accessed the electronic communication, the media guidance application may determine a first time instance when the user accessed the electronic communication, and a second time instance corresponding to the detected change of mental state of the user. For example, as shown in FIG. 2, the user 102 receives an overdue notice 123 via email at a first time, and then the media guidance application may determine that the user 102 has a mental state changed from "calm" to "anxious" (e.g., with an accelerated pulse rate, and a vocal reaction "oh no" 113 indicating a negative tone). In response to determining that the second time instance is later than the first time instance but within a pre-defined time lapse, the media guidance application may determine that the electronic communication is the factor other than the event in the media asset that leads to the change of the mental state of the user. For example, as shown in FIG. 2, if the mental state chance occurs within five seconds (or other pre-defined time) from the time when the user was captured to hold the phone to read the "overdue notice" 123, the media guidance application may determine that the "overdue notice" caused the mental state of "anxiety," instead of the goal for Team Argentina, even if the goal may occur around a similar time. Thus, in response to determining that the factor other than the event in the media asset leads to the change of the mental state of the user, the media guidance application may disassociate the change in the mental state of the user with the event.

The media guidance application may then determine a user preference based on whether the user reacted positively or negatively. Specifically, the media guidance application may determine, based on a type of the change in the mental state of the user, a user preference for or against the one of the first participant and the second participant. For example, as shown in FIG. 1, when Team Argentina has a goal (117), and user 102 exhibits an "excited" mental state, the media guidance application may determine a user preference for Team Argentina.

In some embodiments, the media guidance application may resolve any conflict between the detected user preference in real time while the user is watching the media asset with a previously stored user interest in the user profile. Specifically, the media guidance application may retrieve a user profile corresponding to the user, and determine whether the user profile includes one or more user interest indicators. The media guidance application may then compare the one or more user interest indicators with the determined user preference for or against the one of the first participant and the second participant, and detect, based on the comparing, whether a conflict exists between the one or more user interest indicators and the determined user preference for or against the one of the first participant and the second participant. For example, the media guidance application may identify that the user interest profile includes a user interest for Team Spain, which conflicts with the determine user preference for Team Argentina over Team Spain.

In response to detecting the conflict, the media guidance application may retrieve, from an error log corresponding to the user profile, a logged counter indicating a number of times that the conflict relating to the one of the first participant and the second participant. For example, the error log may keep a record of different incidents that the media guidance application determines a user preference for another team over Team Spain. For another example, the error log may keep a record of incidents that the media guidance application determines a user preference for Team Argentina. In response to determining that the logged counter is greater than a threshold value (e.g., three, four, etc.), the media guidance application may overwrite the stored one or more user interest indicators with the determined user preference for or against the one of the first participant and the second participant. For example, the media guidance application may store Team Argentina as a user interest indicator with the user profile, and remove the previously stored user interest indicator of Team Spain.

In response to determining that the logged counter is less than a threshold value, the media guidance application may log the conflict with the error log corresponding to the user profile. For example, the media guidance application may create an error log file including information of the determined user preference of Team Argentina, the previously stored user interest indicator of Team Spain, a context of the competition between Argentina and Spain, and/or the like. The media guidance application may also refrain from recommending content to the user based on the determined user preference for or against the one of the first participant and the second participant.

Figure 3:
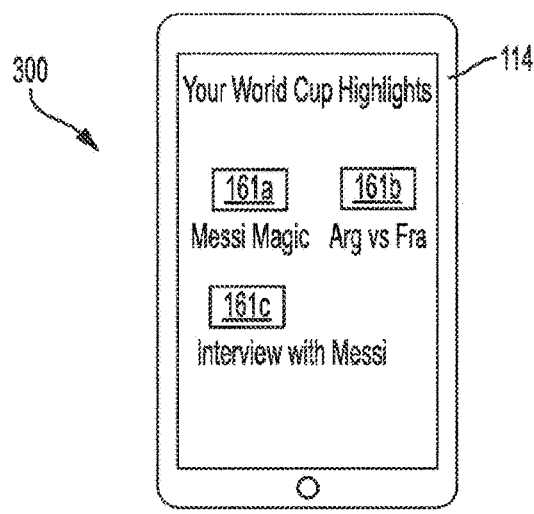
FIG. 3 shows an example diagram illustrating an example screen showing content recommendation based on the determined user preference, accordingly to embodiments described herein.

FIG. 3 shows an example diagram illustrating an example screen showing content recommendation based on the determined user preference, accordingly to embodiments described herein. Diagram 300 shows an example screen, e.g., on the user device 114, or on user equipment 106, of the "World Cup Highlights." As the media guidance application has determined a user preference for Team Argentina, the media guidance application may generate video contents 161a-c relating to Team Argentina for the user. Specifically, the media guidance application may generate for display, a content recommendation relating to the one of the first participant and the second participant when the user has a preference for the one of the first participant and the second participant. For another example, the media guidance application may insert advertisement based on the determined user preference, e.g., commercials featuring products endorsed by players from Team Argentina, and/or the like, into the media asset 108.

In some embodiments, the media guidance application may build a learning model for detecting mental state change. For example, the media guidance application may store successfully identified mental state change with the corresponding biometric or physiological characteristics as a pattern of mental state change. Specifically, in response to generating for display, a content recommendation relating to the one of the first participant and the second participant when the user has a preference for the one of the first participant and the second participant, the media guidance application may determine whether a user command indicative of an interest or disinterest in the content recommendation is received. For example, a user may operate a user device 114 such as a remote control to send a "skip" command when the recommended content is displayed. In response to determining that the user command indicative of disinterest in the content recommendation is received, the media guidance application may generate a first confidence rating of the determined user preference for or against the one of the first participant and the second participant. For example, the media guidance application may assign a relatively low confidence rating of the determined user preference, as the user does not show interest in the recommended content. In response to determining that the user command indicative of the interest in the content recommendation is not received, the media guidance application may generate a second confidence rating of the determined user preference for or against the one of the first participant and the second participant. For example, the media guidance application may assign a relatively high confidence rating of the determined user preference. For another example, the media guidance application may detect that the user elects to display the recommended content, confirming the user interests in the determined user preference. Thus, the media guidance application may store the determined user preference for or against the one of the first participant and the second participant with the user profile. Specifically, the media guidance application may store, with a data table storing characteristics of mental states, characteristics of the set of biometric parameters and the set of the physiological parameters as relevant to the determined mental state change with the confidence rating.

In some implementations, the media guidance application may store the biometric parameters and physiological parameters with the corresponding mental state change with a specific user. In this way, the media guidance application may build a model that is customized to reactions of a particular user.

Figure 7:
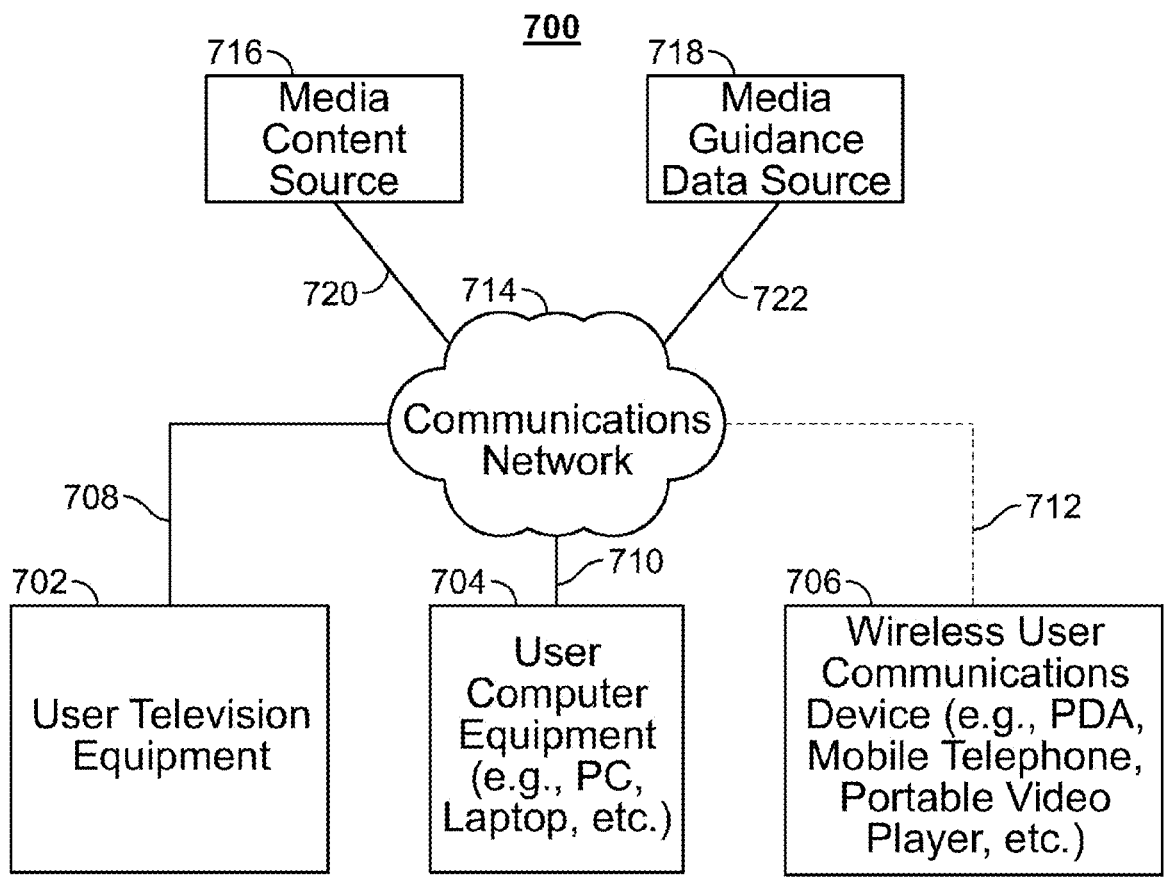
FIG. 7 is a block diagram of an illustrative media system in accordance with some embodiments of the disclosure.

In some implementations, the media guidance application may send the biometric parameters and physiological parameters with the corresponding mental state change, and the confidence rating to a cloud (e.g., data source 718 in FIG. 7). In this way, the stored biometric parameters and physiological parameters and the corresponding mental state change, together with the confidence rating can be applied to determine whether a similar mental state change happens in another user at a later time.

Figure 4:
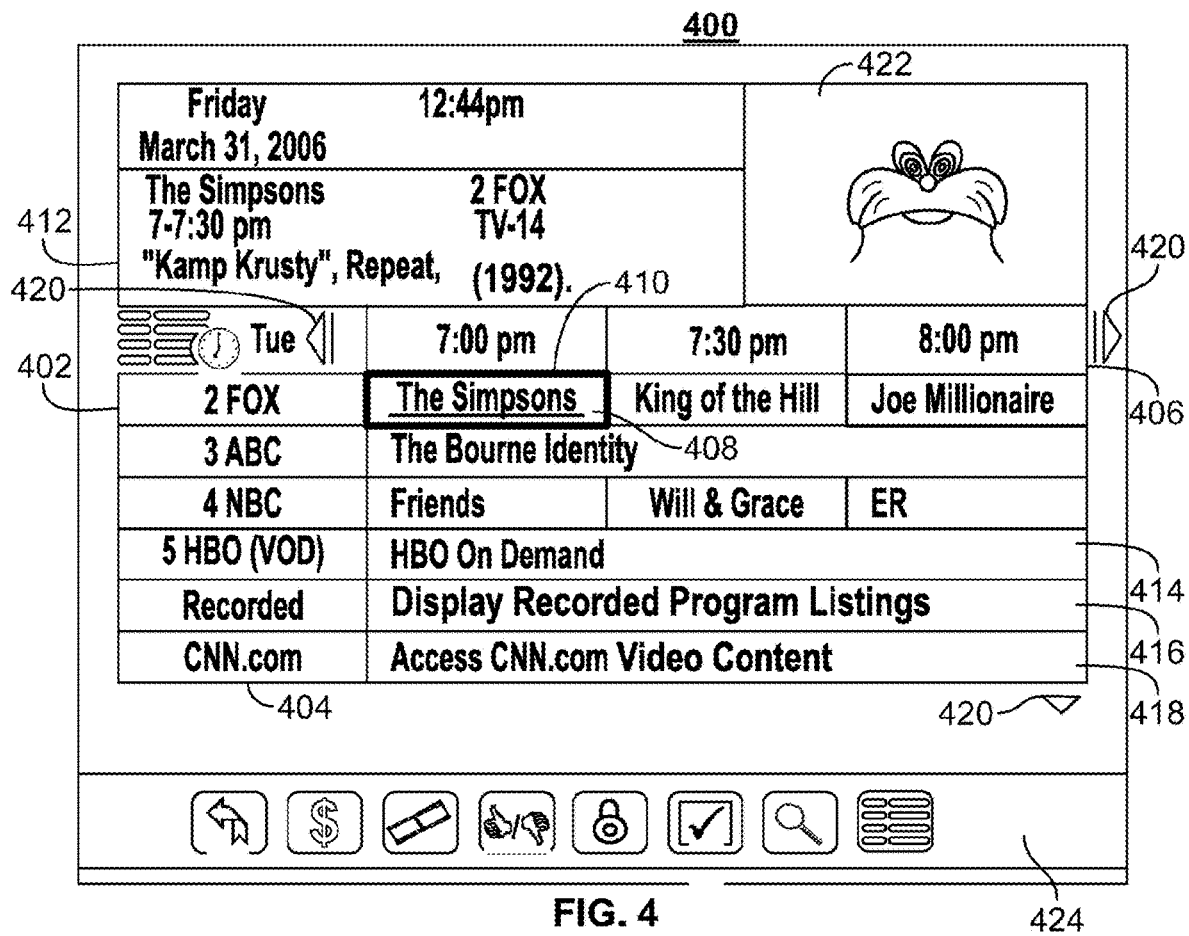
FIG. 4 shows an illustrative embodiment of a display screen that may be used to provide media guidance application listings and other media guidance information, in accordance with some embodiments of the disclosure.
Figure 5:
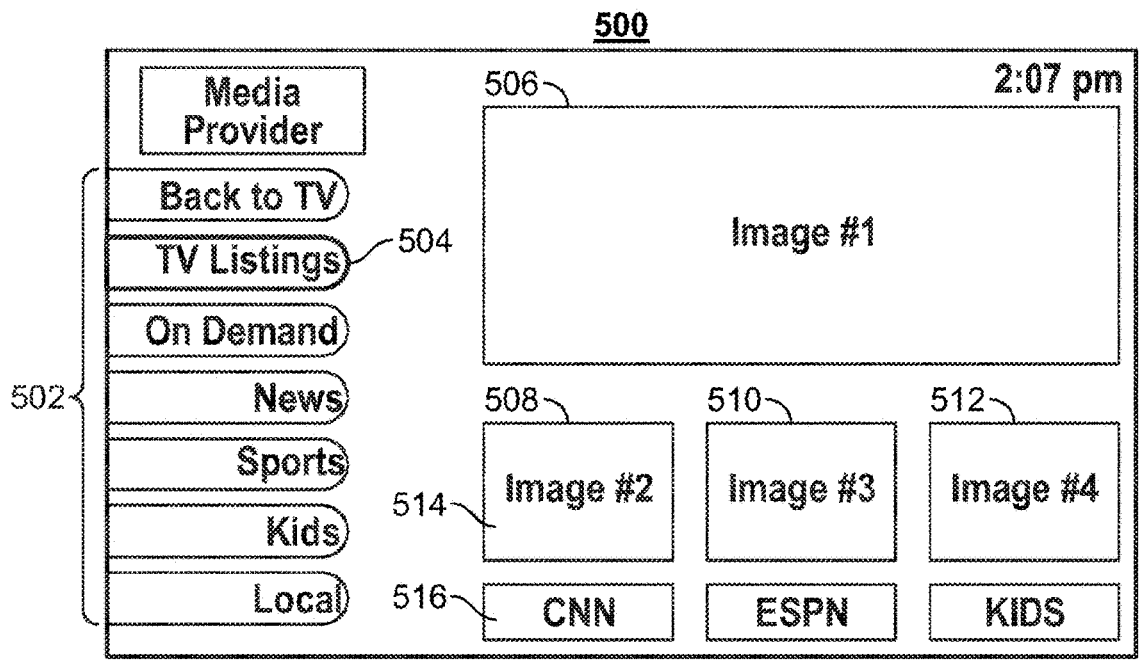
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform, e.g., user equipment 106 or the set-top box 120 in FIG. 1. While the displays of FIGS.

4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 4003 and Yuen et al. U.S. Pat. No. 6,239,794, issued May 49, 4001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 4D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
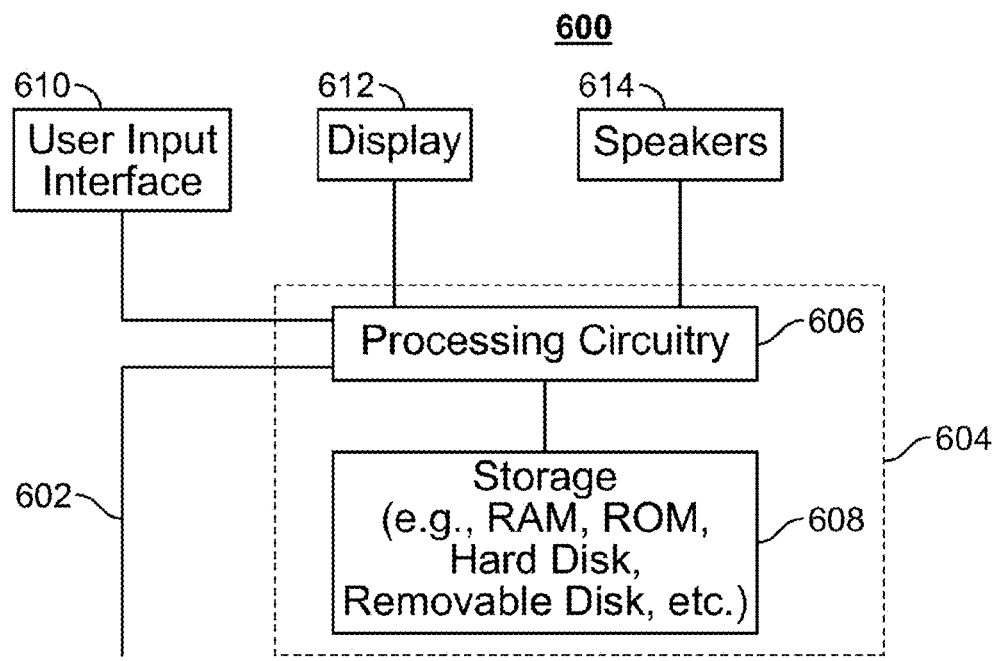
FIG. 6 is a block diagram of an illustrative user equipment (UE) device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 600 of FIG. 6 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 7 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively. Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users" equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 604 of a user equipment device 400. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application via a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

Figure 8:
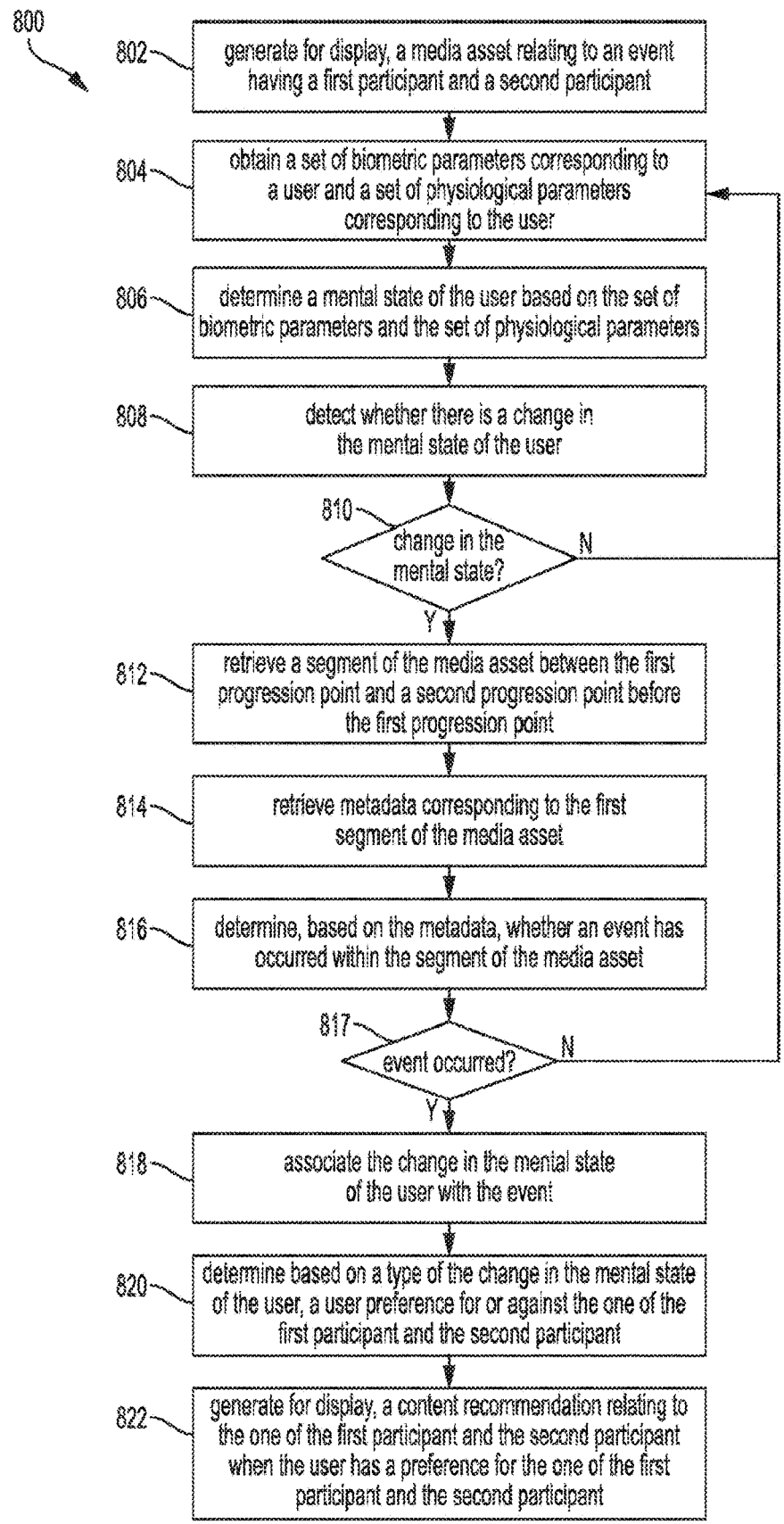
FIG. 8 depicts an illustrative flowchart of a process for determining a preference of a user for or against a participant of an event when a media asset relating to the event is being played, in accordance with some embodiments of the disclosure.

FIG. 8 depicts an illustrative flowchart of a process for determining a preference of a user for or against a participant of an event when a media asset relating to the event is being played, in accordance with some embodiments of the disclosure. Process 800 may be executed by control circuitry 604 (e.g., in a manner instructed to control circuitry 604 by the media guidance application). Control circuitry 604 may be part of user equipment (e.g., user equipment 106, which may have the functionality of any or all of user television equipment 702, user computer equipment 704, and/or wireless communications device 706), or of a remote server separated from the user equipment by way of communications network 714.

Process 800 begins at 802, where control circuitry 604 generates for display a media asset (e.g., 108 in FIG. 1) relating to an event having a first participant and a second participant. For example, the media asset is displayed via display circuitry 612 in FIG. 6 at user equipment 106 in FIG. 1. At 804, control circuitry 604 obtains a set of biometric parameters corresponding to a user and a set of physiological parameters corresponding to the user. For example, control circuitry 604 obtains biometric and physiological measurements via I/O path 602 in FIG. 6. At 806, control circuitry 604 determines a mental state of the user based on the set of biometric parameters and the set of physiological parameters. For example, control circuitry 604 accesses a data table storing characteristics of mental states from storage 618 in FIG. 6, or data source 718 in FIG. 7. At 808, control circuitry 604 detects whether there is a change in the mental state of the user. For example, control circuitry 604 retrieves a previous mental state stored at storage 618 in FIG. 6 and compares the previous mental state with an updated mental state.

At 810, if there is a change in the mental state, process 800 proceeds to 812, where control circuitry 604 retrieves a segment of the media asset between the first progression point and a second progression point before the first progression point. At 814, control circuitry 604 retrieves metadata corresponding to the first segment of the media asset. For example, control circuitry 604 retrieves cached video data and metadata of the media asset from storage 618 in FIG. 6, or data source 716 and 718 in FIG. 7. At 816, control circuitry 604 determines, based on the metadata, whether an event has occurred within the segment of the media asset. For example, as discussed in relation to FIG. 1, control circuitry 614 searches the metadata, e.g., captioning data, to identify keywords representing the occurrence of an event.

At 817, if an event has occurred, process 800 proceeds to 818, where control circuitry 604 associates the change in the mental state of the user with the event. For example, control circuitry 604 stores a mental state of "excitement" with an event of "goal for Argentina" in storage 618 in FIG. 6. At 820, control circuitry 604 determines, based on a type of the change in the mental state of the user, a user preference for or against the one of the first participant and the second participant. For example, control circuitry 604 determines a user preference for Argentina and stores the user preference in storage 618 in FIG. 6. At 822, control circuitry 604 generates for display, e.g., via display circuitry 612 in FIG. 6, a content recommendation relating to the one of the first participant and the second participant when the user has a preference for the one of the first participant and the second participant. For example, control circuitry 604 transmits a query based on the determined user preference for Argentina to media content data source 716 via communications network 714 in FIG. 7.

Figure 9:
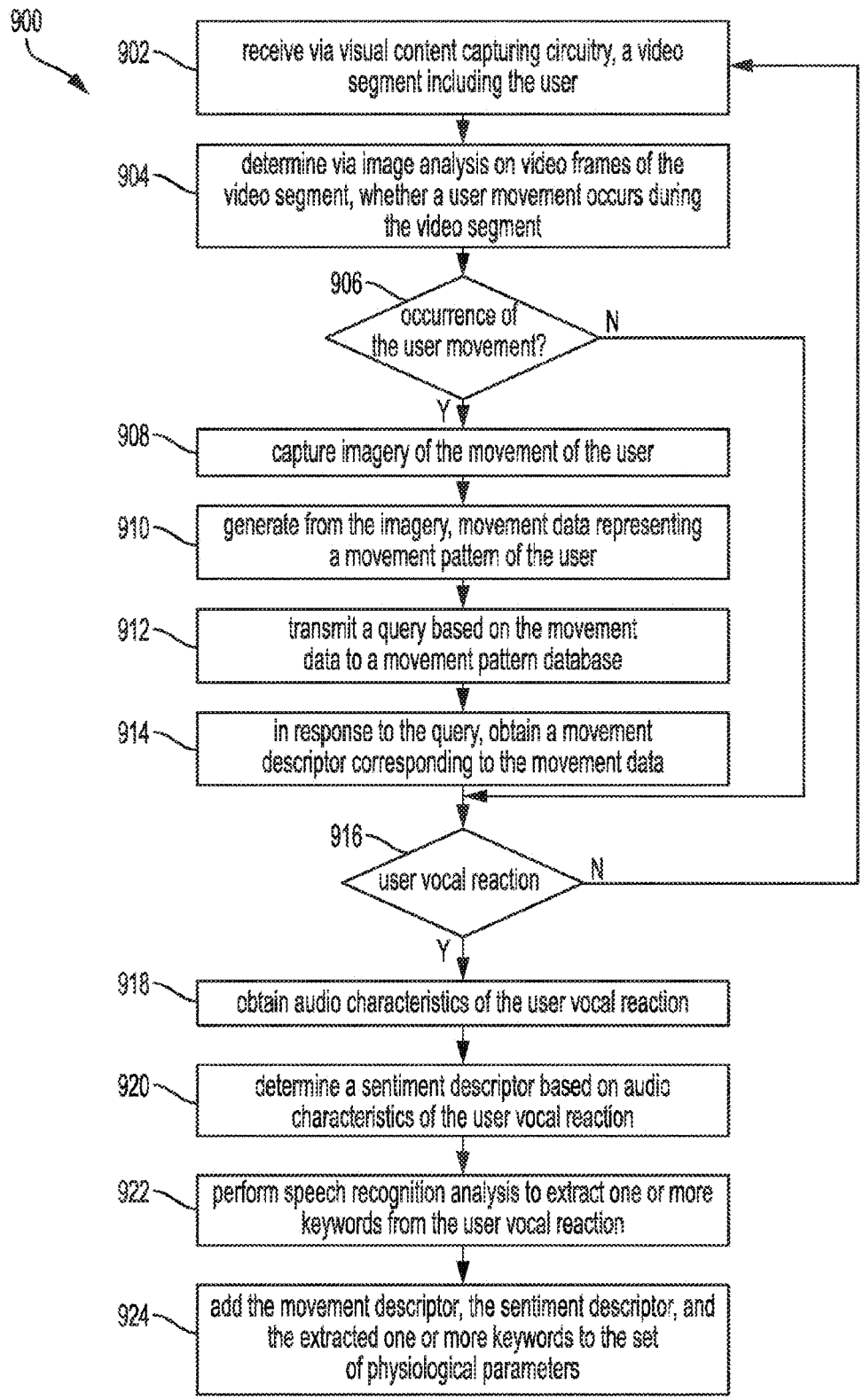
FIG. 9 depicts an illustrative flowchart of a process for capturing biometric and physiological parameters, in accordance with some embodiments of the disclosure.

FIG. 9 depicts an illustrative flowchart of a process for capturing biometric and physiological parameters (e.g., see 804 in FIG. 8), in accordance with some embodiments of the disclosure. Process 900 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 900 begins at 902, where control circuitry 604 receiving, via visual content capturing circuitry (e.g., a camera connected via the I/O path 602 in FIG. 6), a video segment including the user. At 904, control circuitry 604 determines, via image analysis on video frames of the video segment, whether a user movement occurs during the video segment. For example, control circuitry 604 samples consecutive video frames form the video segment, and determines whether the position or the pose of the user within the video frames changes over the frames. At 906, if the occurrence of the user movement happens, process 900 moves to 908, where control circuitry 604 captures imagery of the movement of the user. At 910, control circuitry 604 generates, from the imagery, movement data representing a movement pattern of the user. For example, control circuitry 604 generates position data representing the user movement, in a form of data structures such as a matrix, and/or the like. At 912, control circuitry 604 transmits a query based on the movement data to a movement pattern database. For example, the movement pattern database is stored at storage 618 in FIG. 6 or data source 718 in FIG. 7. At 914, control circuitry 604, in response to the query, obtains a movement descriptor corresponding to the movement data. For example, the movement descriptor includes a key term defining a movement, such as "arm lifting," "jumping," and/or the like.

Process 900 proceeds from 906 to 916, when no user movement occurs, or proceeds from 914 to 916, to determine whether there is a user vocal reaction. Process 900 goes back to 902 if no user vocal reaction is detected at 916. At 916, when a user vocal reaction is detected, process 900 proceeds to 918, where control circuitry 604 obtains audio characteristics of the user vocal reaction. For example, control circuitry 604 analyzes the frequency of the audio signal corresponding to the user vocal reaction to determine a tone of the user vocal reaction. At 920, control circuitry 604 determines a sentiment descriptor based on audio characteristics of the user vocal reaction. For example, control circuitry 604 determines the tone of the user vocal action is "excited." At 922, control circuitry 604 performs speech recognition analysis to extract one or more keywords from the user vocal reaction. At 924, control circuitry 604 adds the movement descriptor, the sentiment descriptor, and the extracted one or more keywords to the set of physiological parameters. For example, control circuitry 604 stores the movement descriptor, the sentiment descriptor, and the extracted one or more keywords in a physiological parameter table at storage 608 in FIG. 6 or data source 718 in FIG. 7.

Figure 10:
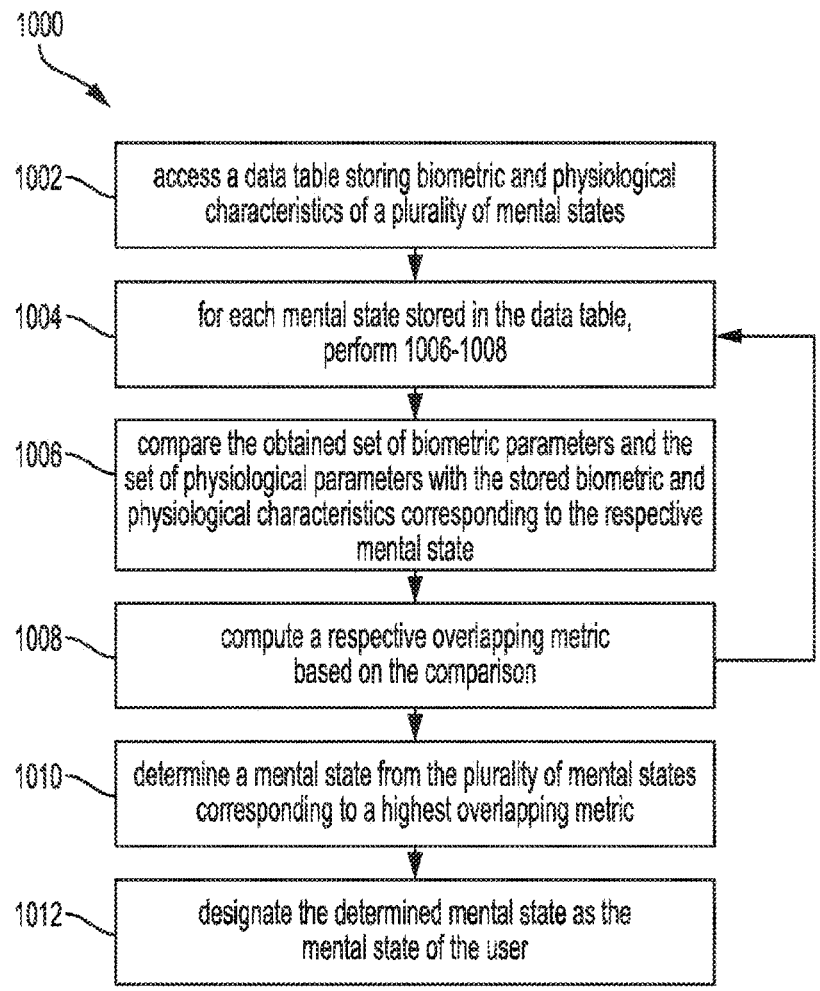
FIG. 10 depicts an illustrative flowchart of a process for determining the mental state of the user based on the set of biometric parameters and the set of physiological parameters, in accordance with some embodiments of the disclosure.

FIG. 10 depicts an illustrative flowchart of a process for determining the mental state of the user based on the set of biometric parameters and the set of physiological parameters (e.g., see 806 in FIG. 8), in accordance with some embodiments of the disclosure. Process 1000 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1000 begins at 1002, where control circuitry 604 accesses a data table storing biometric and physiological characteristics of a plurality of mental states. For example, control circuitry 604 sends an access request to the data table stored in storage 608 in FIG. 6 or data source 718 via communication networks 714 in FIG. 7. At 1004, for each mental state stored in the data table, process 1000 repeats 1006-1008 until each mental state is processed: at 1006, control circuitry 604 compares the obtained set of biometric parameters and the set of physiological parameters with the stored biometric and physiological characteristics corresponding to the respective mental state, and then at 1008, computes a respective overlapping metric based on the comparison. For example, as described in relation to FIG. 1, control circuitry 604 compares the captured user movement data of "arm lifting" with stored characteristics for each mental state. At 1010, control circuitry 604 determines a mental state from the plurality of mental states corresponding to a highest overlapping metric, and then at 1012, designate the determined mental state as the mental state of the user. For example, control circuitry 604 determines the user 102 in FIG. 1 having an "arm lifting" movement and a "laughing" facial expression has a mental state of "excitement."

Figure 11:
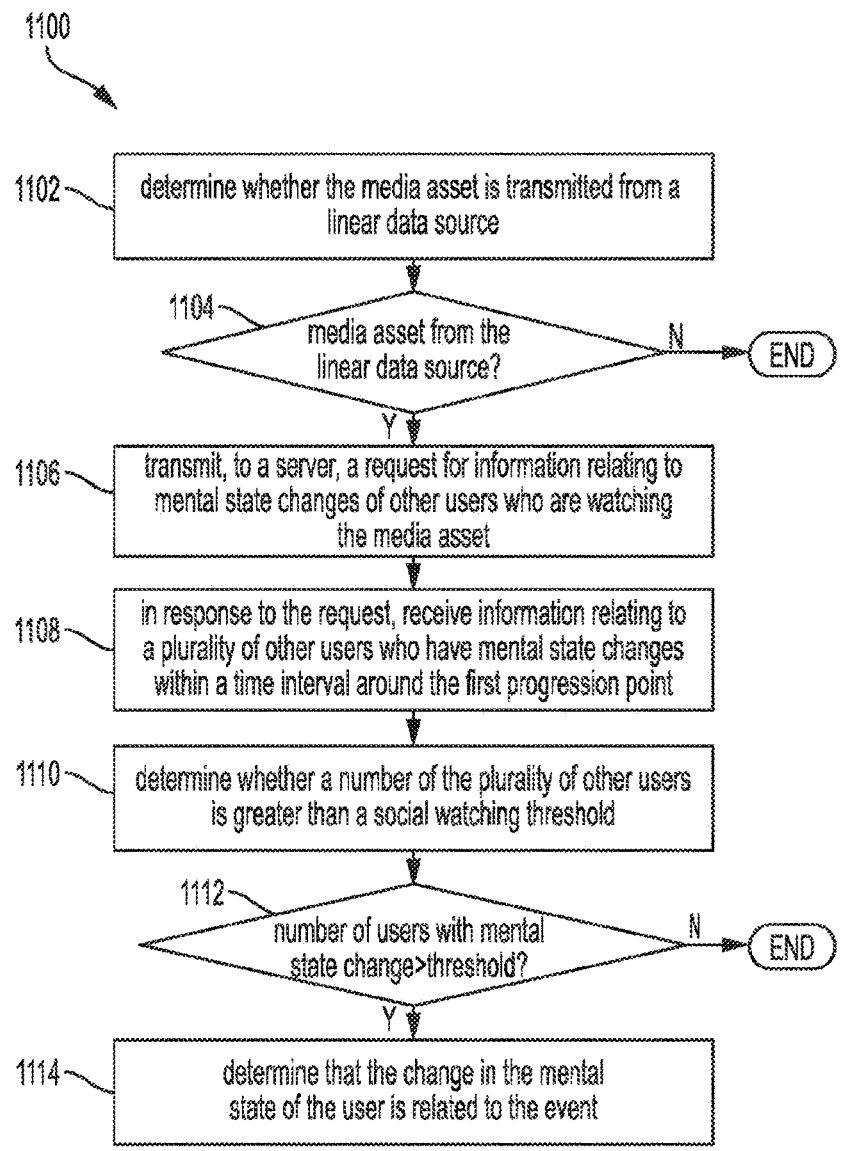
FIG. 11 depicts an illustrative flowchart of a process for associating the change in the mental state of the user with the event, via social watching data, in accordance with some embodiments of the disclosure.

FIG. 11 depicts an illustrative flowchart of a process for associating the change in the mental state of the user with the event (e.g., see 818 in FIG. 8), via social watching data, in accordance with some embodiments of the disclosure. Process 1100 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1100 begins at 1102, where control circuitry 604 determines whether the media asset is transmitted from a linear data source. For example, control circuitry 604 identifies a source identifier for the media asset (e.g., data source 716 in FIG. 7), and determines whether the source identifier corresponds to a live channel. At 1104, in response to determining that the media asset is not transmitted from the linear data source, process 1100 ends. Otherwise, in response to determining that the media asset is transmitted from the linear data source, control circuitry 604 transmits, to a server, a request for information relating to mental state changes of other users who are watching the media asset. For example, data source 718 in FIG. 7 stores information relating to user reactions of other users while the other users are watching the same media asset from the same live channel, e.g., a live soccer game as shown in FIG. 1.

At 1108, in response to the request, control circuitry 604 receives information relating to a plurality of other users who have mental state changes within a time interval around the first progression point. For example, control circuitry 604 receives a list of user identifiers, the corresponding mental state change, and a corresponding time when the mental state change occurs. At 1110, control circuitry 604 determines whether a number of the plurality of other users is greater than a social watching threshold. At 1112, in response to determining that the number of the plurality of other users is greater than the social watching threshold, process 1100 proceeds to 1114, where control circuitry 604 determines that the change in the mental state of the user is related to the event. For example, when the information relating to a large number of users who are watching the same media asset indicates that these users all experience mental state change at a progression point, control circuitry 604 determines that the mental change is likely related to an event that happened at the progression point.

Figure 12:
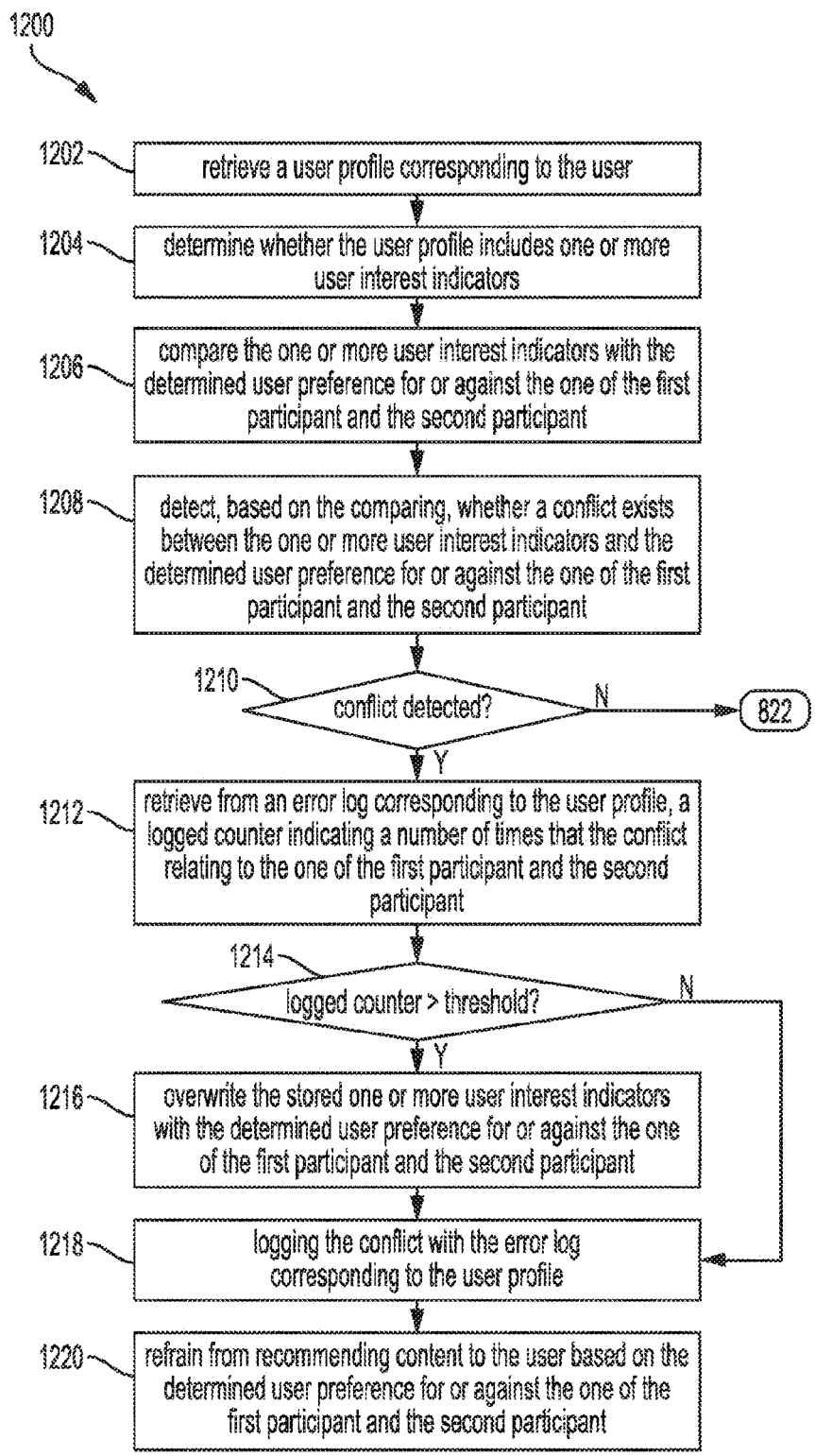
FIG. 12 depicts an illustrative flowchart of a process for resolving a conflict between a determined user preference and a previously stored user interest, in accordance with some embodiments of the disclosure.

FIG. 12 depicts an illustrative flowchart of a process for resolving a conflict between a determined user preference (e.g., at 820 in FIG. 8) and a previously stored user interest, in accordance with some embodiments of the disclosure. Process 1200 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1200 begins at 1202, where control circuitry 604 retrieves, e.g., from storage 608 in FIG. 6 or data source 718 in FIG. 7, a user profile corresponding to the user. At 1204, control circuitry 604 determines whether the user profile includes one or more user interest indicators, e.g., by parsing the user profile. At 1206, control circuitry 604 compares the one or more user interest indicators with the determined user preference for or against the one of the first participant and the second participant. At 1208, control circuitry 604 detects, based on the comparing, whether a conflict exists between the one or more user interest indicators and the determined user preference for or against the one of the first participant and the second participant. For example, as described in relation to FIG. 2, when control circuitry 604 determines a user preference for Team Argentina over Team Spain, but the user profile stores a user interest in "Spain," a conflict is detected. At 1210, when a conflict is detected, control circuitry 604 retrieves, from an error log corresponding to the user profile, a logged counter indicating a number of times that the conflict relating to the one of the first participant and the second participant. For example, the logged counter indicates a numeric value, e.g., three, four, etc., which means that a conflict against the user interest in "Spain" has been detected for three, four, etc. times. At 1210, when no conflict is detected, process 1200 proceed with 822 in FIG. 8.

At 1214, when the logged counter is greater than a threshold (e.g., three, four, etc.), control circuitry 604 overwrites the stored one or more user interest indicators with the determined user preference for or against the one of the first participant and the second participant, at 1216. For example, control circuitry 604 erases the stored user interest in "Spain" in the user profile, and in turn generates a user interest entry of "Argentina" for storing with the user profile. At 1218, control circuitry 604 logs the conflict with the error log corresponding to the user profile. For example, control circuitry 604 generates a log file storing entries relating to a date and time, an event description, a media asset title, a user identifier, a determined preference, a conflict with an existing user interest, and/or the like. At 1220, control circuitry 604 refrains from recommending content to the user based on the determined user preference for or against the one of the first participant and the second participant.

Figure 13:
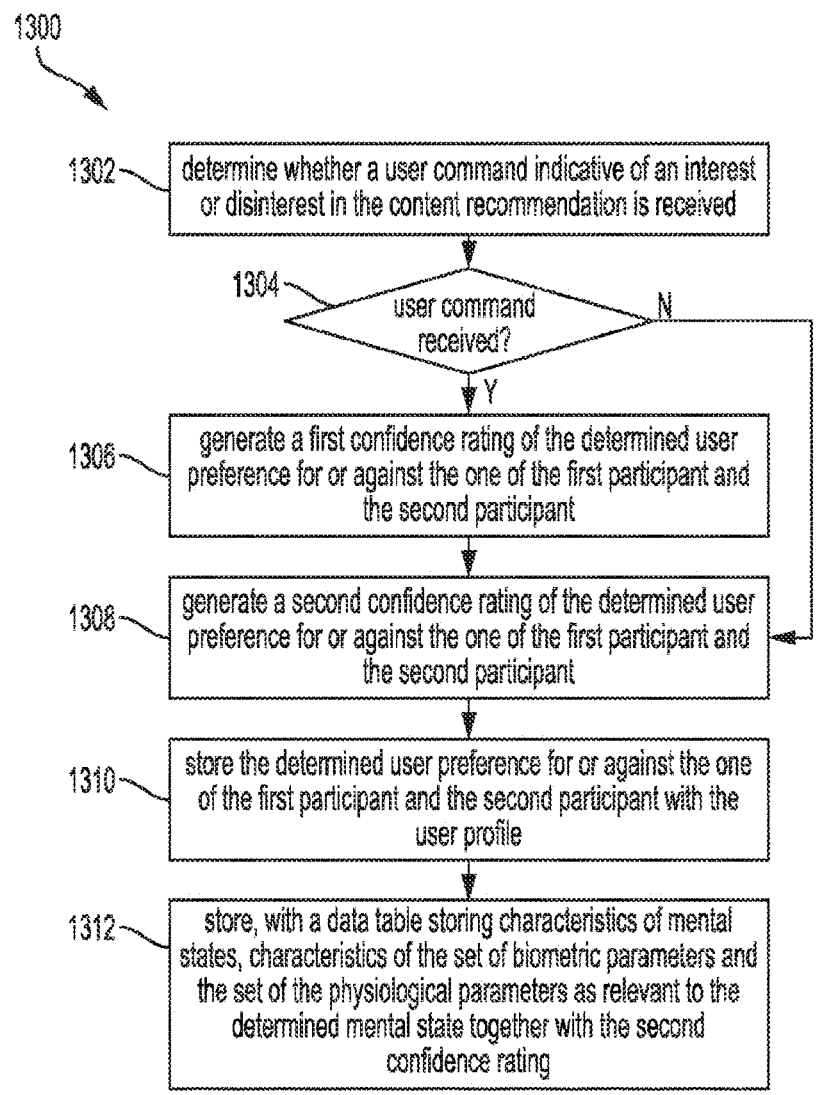
FIG. 13 depicts an illustrative flowchart of a process for building a learning model for determining a user preference using biometric or physiological data, in accordance with some embodiments of the disclosure.

FIG. 13 depicts an illustrative flowchart of a process for building a learning model for determining a user preference using biometric or physiological data, in accordance with some embodiments of the disclosure. Process 1300 may be executed by control circuitry 604 (e.g., in a manner instructed to control circuitry 604 by the media guidance application). Control circuitry 604 may be part of user equipment (e.g., user equipment 106, user television equipment 702, user computer equipment 704, and/or wireless communications device 706), or of a remote server separated from the user equipment by way of communications network 714.

Process 1300 begins at 1302, where control circuitry 604 determines whether a user command indicative of an interest or disinterest in the content recommendation is received. For example, control circuitry 604 may receive a control signal via I/O path 602 or user input interface 610, indicating a user selection to skip recommended content. At 1304, when such a user command is received, control circuitry 604 generates a first confidence (relatively low) rating of the determined user preference for or against the one of the first participant and the second participant, at 1306. At 1304, when no user command to skip is received, control circuitry 604 generates a second confidence rating (relatively high) of the determined user preference for or against the one of the first participant and the second participant. At 1310, control circuitry 604 stores, e.g., at storage 608 in FIG. 6 or data source 718 in FIG. 7, the determined user preference for or against the one of the first participant and the second participant with the user profile. At 1312, control circuitry 604 stores, e.g., at storage 608 in FIG. 6 or data source 718 in FIG. 7, with a data table storing characteristics of mental states, characteristics of the set of biometric parameters and the set of the physiological parameters as relevant to the determined mental state together with the second confidence rating It should be noted that processes 800-1300 or any step thereof could be performed on, or provided by, any of the devices shown in, or described with respect to, FIGS. 1-3 and 6-7. For example, any of processes 800-1200 may be executed by control circuitry 604 (FIG. 6) as instructed by control circuitry implemented on user equipment 106 (FIG. 1), 702, 704, 706 (FIG. 6), and/or the like for generating and displaying a summary view of a media asset. In addition, one or more steps of processes 800-1300 may be incorporated into or combined with one or more steps of any other process or embodiment.

It is contemplated that the actions or descriptions of each of FIGS. 8-13 may be used with any other embodiment of this disclosure. In addition, the actions and descriptions described in relation to FIGS. 8-13 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-13 could be used to perform one or more of the actions in FIGS. 8-13.

It will be apparent to those of ordinary skill in the art that methods involved in the present disclosure may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining whether a mental state change in a user is caused by an event that occurs within a media asset the user is watching, e.g., by processing circuitry 606 of FIG. 6. The processing circuitry, for instance, may be a general purpose processor, a customized integrated circuit (e.g., an ASIC), or a field-programmable gate array (FPGA) within user equipment 600, media content source 716, or media guidance data source 718. For example, the attributes of media assets, may be stored in, and retrieved from, storage 608 of FIG. 6, or media guidance data source 718 of FIG. 7. Furthermore, processing circuitry, or a computer program, may update configuration data of the media guidance application, which may be stored within storage 608 of FIG. 6 or media guidance data source 718 of FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method comprising:
monitoring user activity while a media asset is being generated for display, wherein the media asset comprises a plurality of events, wherein a user interest indicator is associated with at least one characteristic of the media asset, and wherein the user interest indicator is updated based on a change of state of the user associated with an event of the plurality of events;
determining the user received an electronic communication during playback of the media asset;
determining, based on an amount of time between receipt of the electronic communication and a detected change of state of the user, whether the electronic communication caused the change of state of the user; and
in response to determining the electronic communication caused the change of state of the user, disassociating the change of state of the user with all events of the plurality of events.

2. The method of claim 1, wherein the determining, based on an amount of time between receipt of the electronic communication and a detected change of state of the user, whether the electronic communication caused the change of state of the user comprises:
    determining the user accessed the electronic communication;
    identifying a first time instance when the user accessed the electronic communication and a second time instance corresponding to the change of state of the user;
    determining the second time instance occurred after the first time instance;
    in response to the determining the second time instance occurred after the first time instance, calculating a time lapse between the first time instance and the second time instance;
    comparing the time lapse to a threshold period of time;
    determining whether the time lapse is less than the threshold period of time; and
    in response to determining the time lapse is less than the threshold period of time, determining the electronic communication caused the change of state of the user.

3. The method of claim 2, wherein the determining the user accessed the electronic communication comprises:
    receiving a "read" receipt of the electronic communication from a user device.

4. The method of claim 2, wherein the determining the user accessed the electronic communication comprises:
    engaging an imaging capturing device to capture the user's gaze towards a user device.

5. The method of claim 1, wherein the electronic communication comprises a social communication, a news feed publication, or a news ticker generated for display by a device.

6. The method of claim 1, wherein the determining the user received the electronic communication during the playback of the media asset comprises:
    receiving a notification from a user device, or a remove server, relating to the electronic communication.

7. The method of claim 1, wherein the determining the user received the electronic communication during the playback of the media asset comprises:
    engaging an imaging capturing device to capture ambient noise in the user's environment, wherein the ambient noise comprises a message chime, a ring tone, or a notification sound related to the electronic communication.

8. The method of claim 1, further comprising detecting the change of state of the user by:
    detecting at least one change of a biometric state and a physiological state via a device; and
        determining the change of state of the user based on the at least one change.

9. The method of claim 8, wherein the detecting the at least one change via the device comprises:
    receiving video data capturing user activities at the device during presentation of an event in the media asset;
    determining whether the user activities comprise at least one of a user movement and a user vocal reaction;
    in response to determining the user activities include the user movement:
    capturing imagery of the user movement;
    generating, from the imagery, movement data representing a pattern of the user movement;
    transmitting a query based on the movement data to a movement pattern database; and
    in response to the query, obtaining a movement descriptor corresponding to the movement data; and in response to determining the user activities include the user vocal reaction:
    obtaining audio characteristics of the user vocal reaction;
    determining a sentiment descriptor based on the audio characteristics of the user vocal reaction; and
    performing speech recognition analysis to extract one or more keywords from the user vocal reaction; and
    adding the movement descriptor, the sentiment descriptor, and the extracted one or more keywords to a parameter set related to the physiological state.

10. The method of claim 8, wherein the detecting the at least one change via the device comprises:
    accessing a data table storing biometric and physiological characteristics of a plurality of mental states;
    for each mental state stored in the data table:
    comparing the biometric state and the physiological state with the stored biometric and physiological characteristics corresponding to the respective mental state; and
    computing a respective overlapping metric based on the comparing;
    determining a mental state from the plurality of mental states corresponding to a highest overlapping metric; and
    designating the determined mental state as a mental state corresponding to the change of state of the user.

11. A system comprising:
    display circuitry configured to present a media asset at a device; and
    control circuitry configured to:
    monitor user activity while the media asset is being generated for display, wherein the media asset comprises a plurality of events, wherein a user interest indicator is associated with at least one characteristic of the media asset, and wherein the user interest indicator is updated based on a change of state of the user associated with an event of the plurality of events;
    determine the user received an electronic communication during playback of the media asset;
    determine, based on an amount of time between receipt of the electronic communication and a detected change of state of the user, whether the electronic communication caused the change of state of the user; and
    in response to determining the electronic communication caused the change of state of the user, disassociating the change of state of the user with all events of the plurality of events.

12. The system of claim 11, wherein the control circuitry, when determining, based on an amount of time between receipt of the electronic communication and a detected change of state of the user, whether the electronic communication caused the change of state of the user, is configured to:
    determine the user accessed the electronic communication;
    identify a first time instance when the user accessed the electronic communication and a second time instance corresponding to the change of state of the user;
    determine the second time instance occurred after the first time instance;
    in response to determining the second time instance occurred after the first time instance, calculate a time lapse between the first time instance and the second time instance;
    compare the time lapse to a threshold period of time;
    determine whether the time lapse is less than the threshold period of time; and in response to determining the time lapse is less than the threshold period of time, determine the electronic communication caused the change of state of the user.

13. The system of claim 12, wherein the control circuitry, when determining the user accessed the electronic communication, is configured to:
receive a "read" receipt of the electronic communication from a user device.

14. The system of claim 12, wherein the control circuitry, when determining the user accessed the electronic communication, is configured to:
engage an imaging capturing device to capture the user's gaze towards a user device.

15. The system of claim 11, wherein the electronic communication comprises a social communication, a news feed publication, or a news ticker generated for display by the device.

16. The system of claim 11, wherein the control circuitry, when determining the user received the electronic communication during the playback of the media asset, is configured to:
receive a notification from a user device, or a remove server, relating to the electronic communication.

17. The system of claim 11, wherein the control circuitry, when determining the user received the electronic communication during the playback of the media asset, is configured to:
engage an imaging capturing device to capture ambient noise in the user's environment, wherein the ambient noise comprises a message chime, a ring tone, or a notification sound related to the electronic communication.

18. The system of claim 11, wherein the control circuitry, is further configured to detect the change of state of the user, by:
detecting at least one change of a biometric state and a physiological state via the device; and
determining the change of state of the user based on the at least one change.

19. The system of claim 18, wherein the control circuitry, when detecting the at least one change via the device, is configured to:
receive video data capturing user activities at the device during presentation of an event in the media asset;
determine whether the user activities comprise at least one of a user movement and a user vocal reaction;
in response to determining the user activities include the user movement:
capture imagery of the user movement;
generate, from the imagery, movement data representing a pattern of the user movement;
transmit a query based on the movement data to a movement pattern database; and
in response to the query, obtain a movement descriptor corresponding to the movement data; and
in response to determining the user activities include the user vocal reaction:
obtain audio characteristics of the user vocal reaction;
determine a sentiment descriptor based on the audio characteristics of the user vocal reaction; and
perform speech recognition analysis to extract one or more keywords from the user vocal reaction; and
add the movement descriptor, the sentiment descriptor, and the extracted one or more keywords to a parameter set related to the physiological state.

20. The system of claim 18, wherein the control circuitry, when detecting the at least one change via the device, is configured to:
access a data table storing biometric and physiological characteristics of a plurality of mental states;
for each mental state stored in the data table:
compare the biometric state and the physiological state with the stored biometric and physiological characteristics corresponding to the respective mental state; and
compute a respective overlapping metric based on the comparing;
determine a mental state from the plurality of mental states corresponding to a highest overlapping metric; and
designate the determined mental state as a mental state corresponding to the change of state of the user.

* * * * *